United States Patent
Gholap et al.

(10) Patent No.: US 8,490,333 B2
(45) Date of Patent: Jul. 23, 2013

(54) SEALING GASKETS

(75) Inventors: Avinash Keshavrao Gholap, Anderson, SC (US); David L. Hall, Piedmont, SC (US); Partap Singh Chaudhary, Anderson, SC (US); James Scoville, Anderson, SC (US)

(73) Assignee: Electrolux Home Products, Inc., Charlotte, NC (US)

(*) Notice: Subject to any disclaimer, the term of this patent is extended or adjusted under 35 U.S.C. 154(b) by 233 days.

(21) Appl. No.: 11/438,768

(22) Filed: May 23, 2006

(65) Prior Publication Data

US 2007/0084125 A1 Apr. 19, 2007

Related U.S. Application Data

(60) Provisional application No. 60/683,625, filed on May 23, 2005.

(51) Int. Cl.
*E06B 7/16* (2006.01)

(52) U.S. Cl.
USPC .................................. 49/478.1; 49/490.1

(58) Field of Classification Search
USPC ............ 49/478.1, 490.1, 492.1, 493.1, 498.1, 49/475.1
See application file for complete search history.

(56) References Cited

U.S. PATENT DOCUMENTS

| | | | | |
|---|---|---|---|---|
| 2,700,194 A | * | 1/1955 | Rasmussen | 49/496.1 |
| 2,807,841 A | * | 10/1957 | Janos | 49/478.1 |
| 3,126,590 A | * | 3/1964 | Monti | 49/478.1 |
| 4,700,509 A | | 10/1987 | Merla | |
| 5,193,310 A | * | 3/1993 | Kiel | 49/501 |
| 5,588,731 A | | 12/1996 | Schmidt et al. | |
| 5,606,828 A | * | 3/1997 | Hall et al. | 49/490.1 |
| 5,704,107 A | | 1/1998 | Schmidt et al. | |
| 5,908,228 A | | 6/1999 | Lee | |
| 5,916,076 A | | 6/1999 | Cittadini et al. | |
| 6,058,657 A | | 5/2000 | Merla | |
| 6,117,265 A | | 9/2000 | Cittadini et al. | |
| 6,195,942 B1 | * | 3/2001 | Sasaki et al. | 49/489.1 |
| 6,227,634 B1 | | 5/2001 | Cittadini et al. | |
| 2004/0051427 A1 | | 3/2004 | Cittadini et al. | |
| 2004/0139661 A1 | | 7/2004 | Cittadini | |
| 2005/0076575 A1 | | 4/2005 | Cittadini et al. | |

FOREIGN PATENT DOCUMENTS

| | | |
|---|---|---|
| DE | 33 30 991 A1 | 3/1985 |
| DE | 100 32 457 A1 | 1/2002 |
| DE | 201 14 870 U1 | 1/2002 |
| DE | 200 23 001 U1 | 10/2002 |
| EP | 0 690 197 A2 * | 1/1996 |

(Continued)

*Primary Examiner* — Gregory J. Strimbu
(74) *Attorney, Agent, or Firm* — Pearne & Gordon LLP

(57) ABSTRACT

Sealing gaskets are provided for forming a seal between the door of an appliance and the cabinet of the appliance when the door of the appliance is closed onto the cabinet of the appliance. The gaskets are adapted to be mounted to the door of the appliance and comprise a first bellows chamber that can be compressed when the door of the appliance is closed onto the cabinet of the appliance, a pocket contiguous with the first bellows chamber for holding a magnet and a second bellows chamber adapted to be nearer the cabinet of the appliance than the pocket and engage the cabinet of the appliance prior to the pocket engaging the cabinet of the appliance when the door of the appliance is closed. A gasket mounting section is contiguous with the first bellows chamber and includes a first portion that is held in a mounting space.

3 Claims, 2 Drawing Sheets

FOREIGN PATENT DOCUMENTS

| WO | WO 00/28267 | 5/2000 |
| WO | WO 02/063227 A1 | 8/2002 |
| WO | WO 02/070971 A1 | 9/2002 |
| WO | WO 03/048662 A1 | 6/2003 |

* cited by examiner

SEALING GASKETS

CROSS-REFERENCES TO RELATED APPLICATIONS

This application claims the benefit of provisional application number 60/683,625 filed on May 23, 2005.

BACKGROUND OF THE INVENTION

The present invention relates generally to sealing gaskets, and, in particular, the invention relates to sealing gaskets for use with insulating appliances including refrigeration appliances such as refrigerators and freezers.

Insulating appliances, such as refrigerators and freezers for example, normally comprise some type of cabinet in which items that are to be insulated are stored and a door that allows for access to be had to the interior of the cabinet. Typically, in order to maintain items in the cabinet properly insulated, a gasket is provided where the insulating appliance door engages the cabinet when the door is closed onto the cabinet. The gasket establishes a seal that assists in maintaining the conditions within the interior of the cabinet as desired.

A particular appliance that is of the foregoing type comprises a refrigerator for maintaining foodstuffs at sufficiently low temperatures that the foodstuffs will not readily spoil. In one known method of manufacturing such a refrigerator, the exterior of the cabinet of the refrigerator is formed of a metal such as steel. The refrigerator door, on the other hand, is formed of a substantially rigid plastic interior panel and a metallic outer panel with an insulating foam sandwiched between the two panels.

In constructing the refrigerator door, the gasket that is to provide a seal between the refrigerator door and cabinet is formed of a soft plastic or rubber and is first attached to the rigid plastic interior panel adjacent the entire perimeter of the panel. The gasket and interior panel are then preheated in an oven. The plastic interior panel and gasket are thereafter placed into a first portion of a foaming fixture and the metallic outer panel is placed into a second portion of the foaming fixture opposite the interior plastic panel and gasket. A foaming agent is poured into the space between the interior plastic panel and the metallic outer panel and the metallic outer panel is clamped to the interior plastic panel after which the foam cures. As a result, the interior plastic panel, the metallic outer panel and the cured insulating foam between the two panels are formed into an insulated door for the refrigerator with the gasket being attached to the interior plastic panel so that the gasket can seal the interior of the refrigerator cabinet from the exterior of the cabinet when the refrigerator door is closed onto the refrigerator cabinet.

Various types of gaskets have been used in circumstances as described above. In particular, tubular type gaskets having bellows-like chambers are known to be employed.

SUMMARY OF THE INVENTION

According to one aspect, the present invention concerns a gasket for forming a seal between the door of an appliance, such as a refrigerator for example, and the cabinet of the appliance when the door of the appliance is closed onto the cabinet of the appliance and wherein the door of the appliance has an outward section that forms the exterior of the door and an inward section that forms the interior of the door and faces the cabinet of the appliance, with perimeter portions of the outward and inward sections overlapping one another in a manner so as to form a mounting space for the gasket between the overlapping perimeter portions. The gasket is adapted to be mounted to the door of the appliance and comprises a first bellows chamber formed of a material that is sufficiently flexible so that the first bellows chamber can be compressed when the door of the appliance is closed onto the cabinet of the refrigeration appliance. The gasket also includes a pocket that is contiguous with the first bellows chamber for holding a magnet, the pocket being located with relation to the first bellows chamber such that the pocket is adapted to be nearer the cabinet of the appliance than the first bellows chamber and engage the cabinet of the appliance when the door of the appliance is closed onto the cabinet of the appliance. The gasket further includes a second bellows chamber that is made of a flexible material and has two opposed side walls. A first of the two side walls is attached to at least one of the first bellows chamber and the pocket so as to allow for pivotal movement of the second of the two side walls of the second bellows chamber toward and away from the cabinet of the appliance about the site of the attachment of the first of the two side walls to at least one of the first bellows chamber and the pocket. The second of the two side walls of the second bellows chamber is located with relation to the pocket such that the second of the two side walls of the second bellows chamber is adapted to be nearer the cabinet of the appliance than the pocket and engage the cabinet of the appliance prior to the pocket engaging the cabinet of the appliance when the door of the appliance is closed onto the cabinet of the appliance. A gasket mounting section that is contiguous with the first bellows chamber includes a first portion that is adapted to be held in the mounting space between the overlapping perimeter portions of the outward section and inward section of the door of the appliance.

According to another aspect, the inward section of the door of the appliance includes an inner surface that faces the cabinet of the appliance and the first bellows chamber includes first and second sealing members that are in sealing contact with the inner surface of the inward section of the door of the appliance so as to form an insulating air cavity that minimizes air migration from the interior of the cabinet of the appliance. The inward section of the door of the appliance, at least adjacent the perimeter portion of the inward section, can have a stepped configuration in profile that places the inner surface of the inward section of the door of the appliance in close proximity to the first and second sealing members of the first bellows chamber that are in sealing contact with the inner surface of the inward section of the door of the appliance.

According to a further aspect, a portion of the outward section of the door of the appliance can include an outer surface that faces the cabinet of the appliance and the gasket mounting section can include a pair of sealing members that are in sealing engagement with the outer surface of the portion of the outward section of the door of the appliance.

According to still another aspect, a primary gasket for forming a seal between the door of an appliance and the cabinet of the appliance when the door of the appliance is closed onto the cabinet of the appliance can be provided where the inward section of the door of the appliance has a channel running around the inward section adjacent the perimeter portion of the inward section for selectively providing a location for the attachment to the inward section of a replacement gasket for the primary gasket. In that instance, the primary gasket, in addition to comprising a first bellows chamber and a pocket for holding a magnet as previously described, further includes a second bellows chamber made of a flexible material that is contiguous with the first bellows chamber and the pocket and has a sealing portion located with relation to the pocket such that the sealing portion of the second bellows chamber is adapted to be nearer the cabinet of the appliance than the pocket and engage the cabinet of the appliance prior to the pocket engaging the cabinet of the appliance when the door of the appliance is closed onto the cabinet of the appliance. The primary gasket also includes a base support for the first bellows compartment, the second bellows compartment and the pocket. The base support rests on the perimeter portion of the inward section of the door of the appliance and overlies the channel in the inward section of the door of the appliance. A primary gasket mounting section is attached to the base support and the primary gasket mounting section includes a first portion that is adapted to be held in the primary gasket mounting space between the overlapping perimeter portions of the outward section and inward section of the door of the appliance. In a particular aspect, the inward section of the door of the refrigeration appliance includes an inner surface that faces the cabinet of the refrigeration appliance and the second bellows chamber includes a first sealing member that is in sealing contact with the inner surface of the inward section of the door of the refrigeration appliance so as to form between the first sealing member and the base support an insulating air cavity that minimizes air migration from the interior of the cabinet of the appliance. In a further particular aspect, a sealing flap is attached to the base support and is adapted to form a seal with the outward section of the door of the appliance adjacent the perimeter portion of the outward section of the door of the appliance.

According to yet another aspect, a leg depends from the base support and extends into the channel in the inward section of the door of the appliance, the leg being biased against a wall of the channel so as to aid in holding the primary gasket in place on the door of the appliance.

In the foregoing aspects, the gasket mounting section can include a second portion that is attached to the first portion of the gasket mounting section and is larger than the mounting space between the overlapping perimeter portions of the outward section and inward section of the door of the appliance. The second portion of the gasket mounting section is adapted to be located outside the mounting space between the overlapping perimeter portions of the outward section and inward section of the door of the appliance, whereby the gasket mounting section is restrained by the second portion of the gasket mounting section from being withdrawn from the mounting space between the overlapping perimeter portions of the outward section and the inward section of the door of the appliance.

DETAILED DESCRIPTION OF SEVERAL EMBODIMENTS OF THE INVENTION

Figure 1:
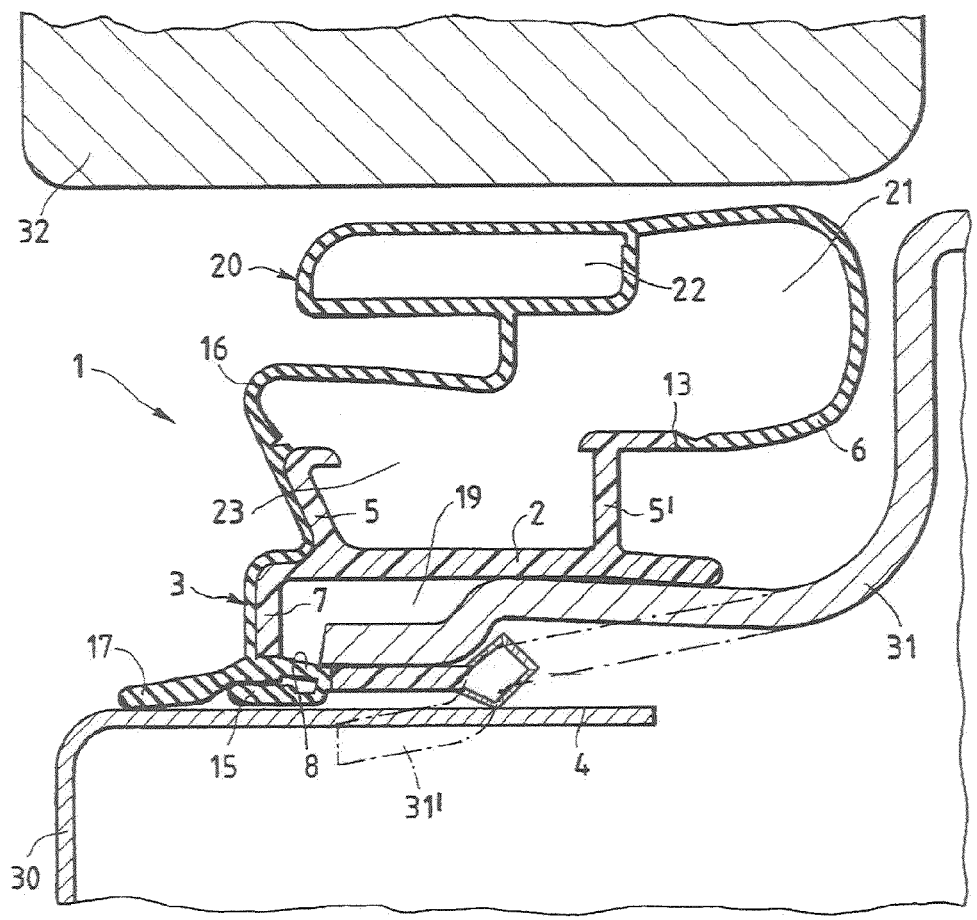
FIG. 1 is a partial cross-sectional view of a first embodiment of a gasket in accordance with the invention.

In FIG. 1 of the drawings a gasket, indicated generally at 10, in accordance with a first embodiment of the invention, is shown in place between a door of an appliance, indicated generally at 12, such as a refrigerator or freezer for example, and a cabinet of the appliance, indicated generally at 14. It will be understood that the door serves to close off the interior of the cabinet and the gasket is in place between the door and cabinet wherever the door and cabinet engage one another when the door is closed onto the cabinet. Thus, the gasket forms a seal between the door of the appliance and the cabinet of the appliance when the door is closed onto the cabinet. Typically, the door is hinged to the cabinet and the gasket is present adjacent the entire perimeter of the door to provide a complete seal between the door and cabinet. It will also be understood that FIG. 1 is a partial cross-sectional view through the door and cabinet, and only portions of the door and cabinet are illustrated for the purpose of showing the relationships between the gasket, appliance door and cabinet. It is also to be noted that although the invention is described below with reference to a refrigerator, the invention can be used in other instances where it is desired to provide a gasket that will act to seal the opening between two structural units such as the door and cabinet of an appliance when the units are closed upon one another.

In the embodiment of FIG. 1, the door of the refrigerator has an outward section or panel 16 that forms the exterior of the door and an inward section or panel 18 that forms the interior of the door and faces the cabinet 14 of the refrigerator. The outward section 16 can be constructed of a metal such as steel and the inward section 18 can be made of a rigid plastic material. The outward and inward sections can be joined together to form an insulated door by injecting a foaming agent into the void 20 and clamping the two sections together while the foam cures as has been described above. The outward section 16 also can be made entirely or in part of a rigid plastic material.

As shown in FIG. 1, perimeter portions 22 of the outward section 16 and perimeter portions 24 of the inward section 18 overlap one another in a manner so as to form a mounting space 26 for the gasket 10 between the overlapping perimeter portions.

In the embodiment of the invention shown in FIG. 1, the gasket 10 is adapted to be mounted to the door 12 of the refrigerator. The gasket comprises a first bellows chamber 28 that is formed of a material that is flexible, such as rubber or a soft plastic for example, so that the first bellows chamber can be compressed when the door 12 of the refrigerator is closed onto the cabinet 14 of the refrigerator. As will be understood by those skilled in the art, the first bellows chamber 28 is provided with suitable openings through which air can be expelled from the bellows chamber and enter the bellows chamber when the bellows chamber is compressed and expands, respectively.

A pocket 30 is contiguous with the first bellows chamber 28 for holding a magnet not shown. The pocket 30 is located with relation to the first bellows chamber 28 such that the pocket is adapted to be nearer the cabinet 14 of the refrigerator than the first bellows chamber 28 and engage the cabinet of the refrigerator when the door of the refrigerator is closed onto the cabinet of the refrigerator. It will be understood, therefore, that as the door 12 is closed onto the cabinet 14, the magnet in the pocket 30 will eventually engage the cabinet. By constructing the cabinet of a magnetic metal such as steel, the gasket 10 will become securely attached to the cabinet when the magnet in the pocket 30 engages the cabinet 14.

The gasket 10 also includes a second bellows chamber 32 made of a flexible material such as rubber or a soft plastic. The second bellows chamber 32 has a first side wall 34 and a second side wall 36 that are opposed to one another. The first side wall 34 is attached to at least one of the first bellows chamber 28 and the pocket 30 so as to allow for pivotal movement of the second side wall 36 toward and away from the cabinet 14 of the refrigerator about the site of attachment of the first side wall 34 to either the first bellows chamber 28 or the pocket 30. The second side wall 36 is located with relation to the pocket 30 such that the second side wall 36 is adapted to be nearer the cabinet 14 of the refrigerator than the pocket 30 and engage the cabinet 14 of the refrigerator prior to the pocket 30 engaging the cabinet of the refrigerator when the door of the refrigerator is closed onto the cabinet of the refrigerator. It will thus be understood that the second bellows chamber 32 will provide an effective sealing surface both because the second bellows chamber first engages the cabinet well before the door is completely closed onto the cabinet and because the second bellows chamber can be compressed to allow for even a greater sealing effect.

The gasket 10 is mounted to the door 12 of the refrigerator by a gasket mounting section 40. The gasket mounting section 40 is contiguous with the first bellows chamber 28. The gasket mounting section includes a first portion 42 that is adapted to be held in the mounting space 26 between the overlapping perimeter portions 22 and 24 of the outward section and inward section, respectively, of the door of the refrigerator.

In the embodiment of FIG. 1, the gasket mounting section 40 includes a second portion 44 that is attached to the first portion 42 of the gasket mounting section and is larger than the mounting space 26 between the overlapping perimeter portions 22 and 24 of the outward section and inward section, respectively, of the door of the refrigerator. Additionally, in the embodiment of FIG. 1, the second portion 44 is bulbous in shape and is adapted to be located outside the mounting space 26 between the overlapping perimeter portions 22 and 24 of the outward and inward sections of the door of the refrigerator appliance, whereby the gasket mounting section is restrained by the second portion 44 from being withdrawn from the mounting space 26 between the overlapping perimeter portions of the outward section and inward section of the door of the refrigerator.

It will also be seen in the embodiment of FIG. 1 that the inward section 18 of the door of the refrigerator includes an inner surface 46 that faces the cabinet of the refrigerator. In addition, the first bellows chamber 28 includes first and second sealing members 48 and 50 that are in sealing contact with the inner surface 46 of the inward section of the door of the refrigerator so as to form an insulating air cavity 52 that minimizes cold-air migration from the interior of the cabinet 14 of the refrigerator.

An additional feature of the embodiment of FIG. 1 that can be provided concerns the structural configuration of the inward section 18 of the door of the refrigerator. Specifically, the structural configuration, at least adjacent the perimeter portion 24 of the inward section, can have a stepped configuration in profile as shown in FIG. 1 that places the inner surface 46 of the inward section 18 of the door of the refrigerator in close proximity to the first and second sealing members 48 and 50 of the first bellows chamber that are in sealing contact with the inner surface of the inward section of the door of the refrigerator. It will be understood that with this arrangement, a savings in material required for the sealing member 50 will result.

A further aspect of the embodiment of FIG. 1 that can be incorporated into the gasket 10 are a pair of sealing members 54 and 56 that are in sealing engagement with the outer surface 58 of the outward section 16 of the door of the refrigerator. For purposes of facilitating an understanding of the embodiment shown in FIG. 1, the sealing members 54 and 56 are not shown as in sealing engagement with the outer surface 58.

Figure 2:
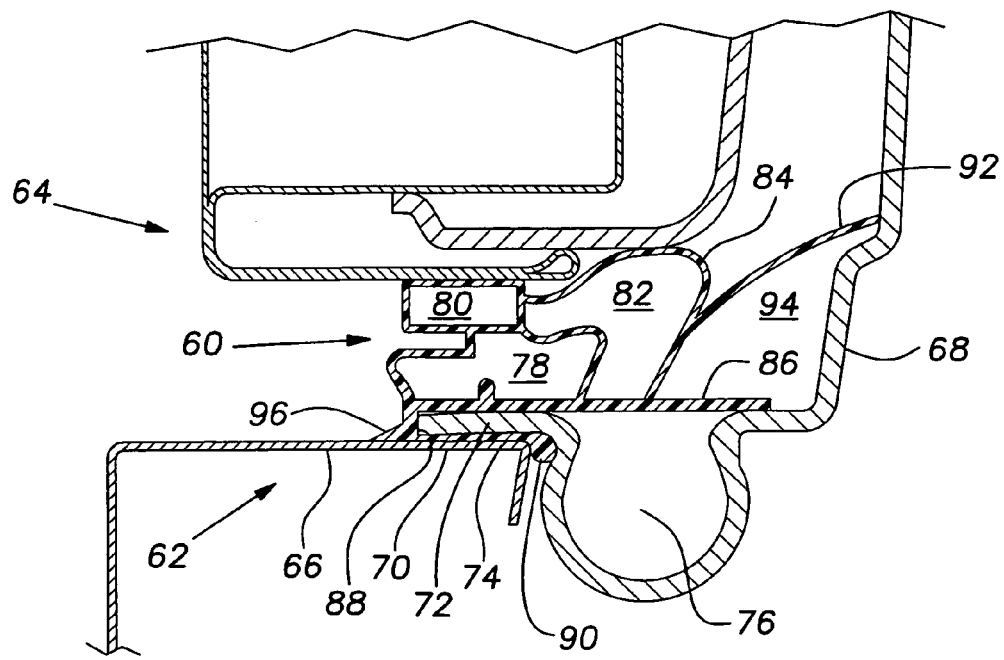
FIG. 2 is a partial cross-sectional view of a second embodiment of a gasket in accordance with the invention.

In a second embodiment of the invention shown in FIG. 2, there is depicted a primary gasket indicated generally at 60 for forming a seal between the door 62 of a refrigerator and the cabinet 64 of the refrigerator when the door is closed onto the cabinet. As with the embodiment of FIG. 1, the door has an outward section 66 that forms the exterior of the door and an inward section 68 that forms the interior of the door and faces the cabinet of the refrigerator. Perimeter portions 70 and 72 of the outward and inward sections, respectively, overlap one another in a manner so as to form a mounting space 74 for the primary gasket 60 between the overlapping perimeter portions. In this second embodiment, the inward section 68 of the door of the refrigerator has a channel 76 that runs around the inward section adjacent the perimeter portion 72 of the inward section for selectively providing a location for the attachment to the inward section of a replacement gasket for the primary gasket 60. In other words, the channel 76 can be used with a replacement gasket that is provided with dart-type attaching members that can be press-fitted into the channel for the purpose of securing the replacement gasket to the door 68.

The primary gasket 60 comprises a first bellows chamber 78 formed of a material that is sufficiently flexible, such as rubber or soft plastic, so that the first bellows chamber can be compressed when the door of the refrigerator is closed onto the cabinet of the refrigerator. A pocket 80 is contiguous with the first bellows chamber 78 for holding a magnet not shown. The pocket 80 is located with relation to the first bellows chamber 78 such that the pocket is adapted to be nearer the cabinet 64 of the refrigerator that the first bellows chamber and engage the cabinet of the refrigerator when the door of the refrigerator is closed onto the cabinet of the refrigerator.

A second bellows chamber 82 made of a flexible material such as rubber or a soft plastic is contiguous with the first bellows chamber 78 and the pocket 80 and has a sealing portion 84 located with relation to the pocket such that the sealing portion of the second bellows chamber is adapted to be nearer the cabinet 64 of the refrigerator than the pocket and engage the cabinet of the refrigerator prior to the pocket engaging the cabinet of the refrigerator when the door of the refrigerator is closed onto the cabinet of the refrigerator.

A base support 86 for the first bellows compartment 78, the second bellows compartment 82 and the pocket 80 is included in the embodiment of FIG. 2. The base support rests on the perimeter portion 72 of the inward section of the door of the refrigerator and overlies the channel 76 in the inward section of the door of the refrigerator.

A primary gasket mounting section 88 is attached to the base support 86. The primary gasket mounting section includes a first portion that is adapted to be held in the primary gasket mounting space 74 between the overlapping perimeter portions 70 and 72 of the outward section and inward section, respectively, of the door of the appliance.

The primary gasket mounting section 88 also can include a second portion 90 that is attached to the first portion of the primary gasket mounting section and is larger than the primary gasket mounting space 74 between the overlapping perimeter portions of the outward section and inward section of the door of the refrigerator.

The second portion 90 is adapted to be located outside the primary gasket mounting space 74 between the overlapping perimeter portions of the outward section and inward section of the door of the refrigerator, whereby the primary gasket mounting section is restrained by the second portion of the primary gasket mounting section from being withdrawn from the primary gasket mounting space between the overlapping perimeter portions of the outward section and the inward section of the door of the refrigerator.

The second bellows chamber 82 also can include a first sealing member 92 that is in sealing contact with the inner surface of the inward section of the door of the refrigerator so as to form between the first sealing member 92 and the base support 86 an insulating air cavity 94 that minimizes cold-air migration from the interior of the cabinet of the refrigerator.

Additionally, a sealing flap 96 can be attached to the base support 86 so as to be adapted to form a seal with the outward section 66 of the door of the refrigerator adjacent the perimeter portion 70 of the outward section of the door of the refrigerator.

Figure 3:
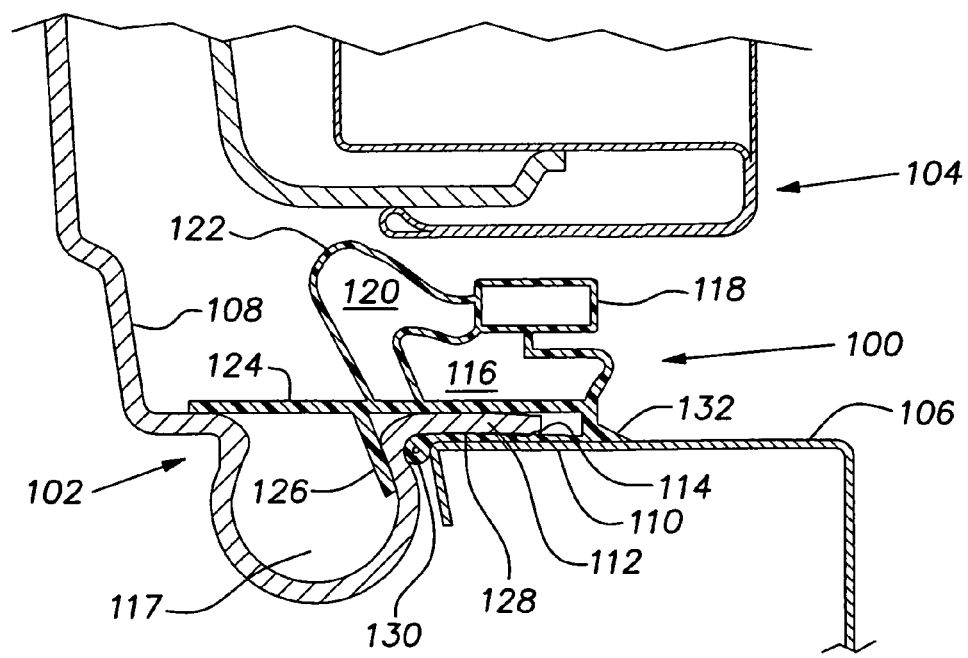
FIG. 3 is a partial cross-sectional view of a third embodiment of a gasket in accordance with the invention.

A third embodiment of the invention is shown in FIG. 3. As with the embodiment of FIG. 2, in the embodiment of FIG. 3 a primary gasket 100 is provided for forming a seal between the door 102 of a refrigerator and the cabinet 104 of the refrigerator when the door of the refrigerator is closed onto the cabinet of the refrigerator. Again, the door of the refrigerator can have an outward section 106 that forms the exterior of the door and an inward section 108 that forms the interior of the door and faces the cabinet of the refrigerator. Perimeter portions 110 and 112 of the outward and inward sections, respectively, overlap one another in a manner so as to form a mounting space 114 for the primary gasket 100 between the overlapping perimeter portions, and the inward section of the door of the refrigerator has a channel 117 that runs around the inward section adjacent the perimeter portion of the inward section for selectively providing a location for the attachment to the inward section of a replacement gasket for the primary gasket in the manner described with reference to the embodiment of the invention shown in FIG. 2.

The primary gasket 100 for forming a seal between the door of the refrigerator and the cabinet of the refrigerator is adapted to be mounted to the door of the refrigerator. The gasket comprises a first bellows chamber 116 formed of a material that is sufficiently flexible, such as rubber or a soft plastic, so that the first bellows chamber can be compressed when the door of the refrigerator is closed onto the cabinet of the refrigerator. A pocket 118 is contiguous with the first bellows chamber for holding a magnet not shown. The pocket 118 is located with relation to the first bellows chamber 116 such that the pocket is adapted to be nearer the cabinet 104 of the refrigerator than the first bellows chamber and engage the cabinet of the refrigerator when the door of the refrigerator is closed onto the cabinet of the refrigerator.

A second bellows chamber 120 made of a flexible material such as rubber or a soft plastic is contiguous with the first bellows chamber 116 and the pocket 118 and has a sealing portion 122 located with relation to the pocket such that the sealing portion of the second bellows chamber is adapted to be nearer the cabinet 104 of the refrigerator than the pocket 118 and engage the cabinet of the refrigerator prior to the pocket engaging the cabinet of the refrigerator when the door of the refrigerator is closed onto the cabinet of the refrigerator.

The primary gasket includes a base support 124 for the first bellows compartment 116, the second bellows compartment 120 and the pocket 118. The base support 124 rests on the perimeter portion 112 of the inward section of the door of the refrigerator and overlies the channel 116 in the inward section of the door of the refrigerator. A leg 126 depends from the base support 124 and extends into the channel 116 in the inward section of the door of the refrigerator. The leg 126 is biased against a wall of the channel 116 so as to aid in holding the primary gasket 100 in place on the door of the refrigerator.

A primary gasket mounting section 128 is attached to the base support 124. The primary gasket mounting section 128 includes a first portion that is adapted to be held in the primary gasket mounting space 114 between the overlapping perimeter portions 110 and 112, respectively, of the outward section and inward section of the door of the refrigerator. The primary gasket mounting section 128 can include a second portion 130 that is attached to the first portion of the primary gasket mounting section and is larger than the primary gasket mounting space 114 between the overlapping perimeter portions of the outward section and inward section of the door of the refrigerator. The second portion 130 is adapted to be located outside the primary gasket mounting space 114 between the overlapping perimeter portions of the outward section and inward section of the door of the refrigerator, whereby the primary gasket mounting section 128 is restrained by the second portion 130 of the primary gasket mounting section from being withdrawn from the primary gasket mounting space 114 between the overlapping perimeter portions of the outward section and the inward section of the door of the refrigerator.

A sealing flap 132 can be attached to the base support 124 so as to be adapted to form a seal with the outward section 106 of the door of the refrigerator adjacent the perimeter portion 110 of the outward section of the door of the refrigerator.

Although several particular embodiments of the invention have been described in detail above, it will be understood that the invention is not limited to those embodiments but includes all changes and modifications that are within the literal and equivalent scope of the claims that follow.

What is claimed is:

1. A gasket for forming a seal between a door of an appliance and a cabinet of the appliance when the door of the appliance is in a closed position, the door of the appliance having an outer panel that forms an exterior of the door and an inner panel that forms an interior of the door of the appliance and faces the cabinet of the appliance, perimeter portions of the outer and inner panels overlapping one another in a manner so as to form a mounting space for the gasket between the overlapping perimeter portions, the gasket being adapted to be mounted to the door of the appliance and comprising:
    a first bellows chamber formed of a material that is sufficiently flexible so that the first bellows chamber can be compressed when the door of the appliance is in the closed position;
    wherein the inner panel of the door of the appliance includes an inner surface that faces the cabinet of the appliance and the first bellows chamber including a first sealing member that is in sealing contact with the inner surface of the inner panel of the door of the appliance; and
    a gasket mounting section contiguous with the first bellows chamber, the gasket mounting section including a first portion that is held in the mounting space and a second portion attached to the first portion, the second portion including a cross-sectional dimension that is larger than a distance between the overlapping perimeter portions of the outer panel and the inner panel of the door of the appliance and is disposed outside the overlapping perimeter portions of the outer panel and the inner panel of the door of the appliance;
    wherein the first bellows chamber includes a second sealing member that is in sealing contact with the inner surface of the inner panel of the door of the appliance so as to cooperate with the first sealing member to form an air cavity, wherein the first sealing member is in sealing contact with the perimeter portion of the inner panel and the second sealing member is in sealing contact with the inner panel at a stepped portion of the inner panel which is parallel to and stepped from the perimeter portion of the inner panel;
    wherein a connecting portion of the gasket mounting section projects in a generally perpendicular direction with respect to the outer panel of the door, wherein the connecting portion of the gasket mounting section is spaced a distance from a distal end of the perimeter portion of the inner panel and the distal end of the perimeter portion of the inner panel does not contact the connecting portion.

2. The gasket of claim 1, wherein the second portion that is attached to the first portion is unsupported outside the overlapping perimeter portions of the outer panel and the inner panel of the door of the appliance.

3. The gasket of claim 1, wherein the stepped portion of the inner panel is adjacent the perimeter portion of the inner panel.

* * * * *